Dec. 29, 1942.   H. A. BUEHNER   2,306,612
PIPE CONNECTION FOR PRESSURE VESSELS
Filed Oct. 31, 1940
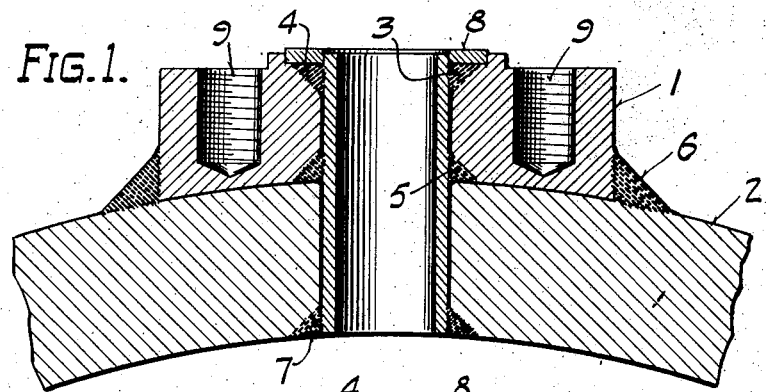
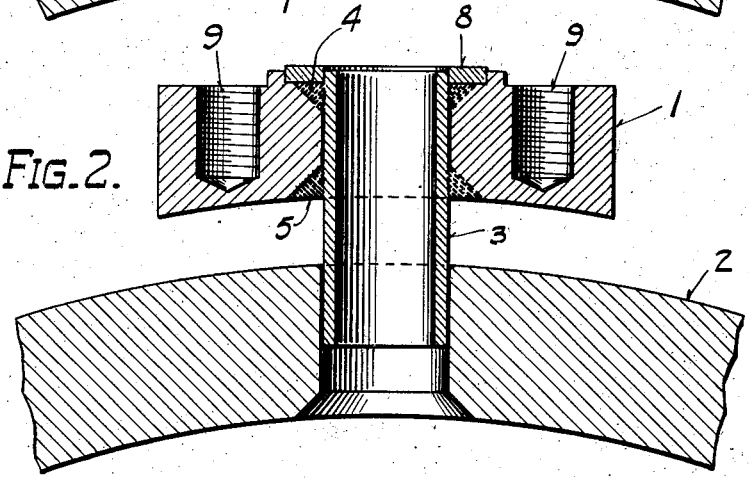
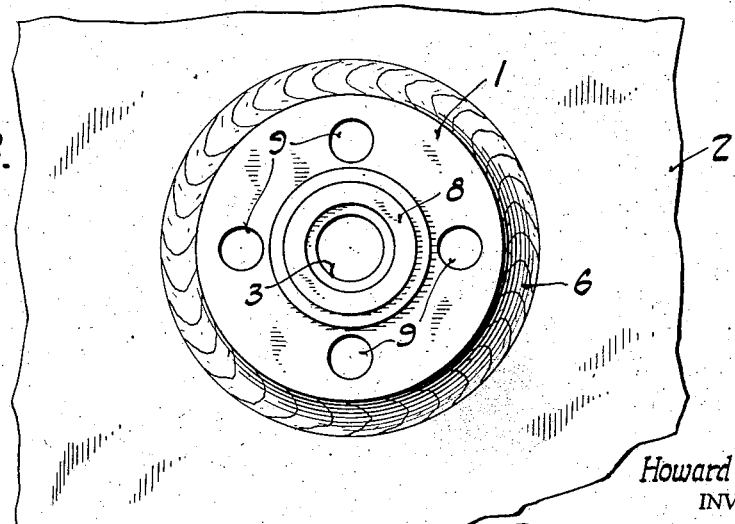
Howard A. Buehner
INVENTOR.
BY
ATTORNEY.

Patented Dec. 29, 1942

2,306,612

UNITED STATES PATENT OFFICE 2,306,612

PIPE CONNECTION FOR PRESSURE VESSELS

Howard A. Buehner, Milwaukee, Wis., assignor to A. O. Smith Corporation, Milwaukee, Wis., a corporation of New York Application October 31, 1940, Serial No. 363,631

2 Claims. (Cl. 285—106)

This invention relates to a pipe connection for pressure vessels.

The providing of connections for small piping on large vessels of heavy wall thickness has always presented a problem. The small diameter of the opening makes it impractical to weld on the inside between the reenforcing pad and the vessel wall. Consequently, the reenforcing pad has heretofore been held in place only by a weld deposit around its outer circumference. Furthermore, only a single weld was utilized as the seal for pressure.

The object of the present invention is to provide a connection for small openings in which the reenforcing pad is secured at both its outer circumference and at its edge encircling the opening. Another object is to provide a connection of the class described in which there are at least two separate welds between the inside and outside for retaining the pressure in the vessel.

Other objects will be clear from the following description of an embodiment of the invention illustrated in the accompanying drawing.

In the drawing:

Figure 1 is a sectional view through the wall of a vessel and a pipe connection;

Fig. 2 is a similar sectional view showing the connection and wall spaced apart prior to assembly; and Fig. 3 is a top plan view, on reduced scale, of the connection assembled to the vessel as in Fig. 1.

The connection comprises a reenforcing pad 1 of substantial thickness to provide reenforcement of the vessel wall 2 about the opening therethrough. The pad 1 has its inner surface machined or formed on a curvature corresponding to that of the outside of the vessel wall.

The connection further comprises a central tubular member 3 extending through both the pad 1 and wall 2 and having an outside diameter enabling it to fit closely in the opening in the wall and in a corresponding opening in the pad.

The inner corners of the pad are cut away at an angle and weld metal 4 is deposited in the upper groove thus provided to join the outer end of the tube 3 to the pad, and weld metal 5 is deposited in the lower groove thus provided to join the central portion of the tube to the pad. Weld metal 5 is machined to be level with the lower surface of the pad so as not to interfere with the application of the connection to the vessel wall.

After the connection is fabricated as above indicated and as shown in Fig. 2, it is assembled with the vessel wall and weld metal 6 is deposited around the outer circumference of the pad 1 to secure the pad to the vessel wall. In addition to this, the inner corner of the vessel wall adjacent the opening is cut away and weld metal 7 is deposited in the groove thus provided to weld the inner end of the tube 3 to the vessel wall.

The outer surface of the pad 1 may be provided with an alloy insert ring 8 for sealing purposes and with threaded stud openings 9 for receiving bolts for securing a flanged pipe end to the pad.

In the construction of the invention all of the welds are readily made since their locations are easily accessible at the time of welding. Furthermore, the outer weld 6 need not be as heavy or expensive as in former constructions since weld 7 adds considerably to the strength of the attachment of the connection to the vessel wall. From the standpoint of possible leakage, there are two separate welds both of which must pass fluid before any leakage will occur.

The invention is claimed as follows:

1. A structure of the class described comprising a vessel wall of substantial thickness and having a hole therethrough, a reinforcing pad of substantial thickness and having an opening aligned with the hole in the vessel wall, weld metal joining the pad to the vessel at the outer circumference of the pad, a tube extending through the pad and wall and substantially fitting in said hole, weld metal joining the inner end of the tube to the vessel wall, and weld metal joining the upper and lower inner corners of the pad to the tube, the weld at said lower inner corner of the pad being independent of the surface of the vessel wall.

2. A pipe connection for a pressure vessel, comprising a reinforcing pad of substantial thickness with an opening extending through the pad and vessel wall, a tube fitting in said opening and extending through the pad and vessel wall, said tube and pad being adapted for securing a pipe connection thereto, the inner corners of the pad providing welding grooves filled with weld metal joining the pad to the tube without joining the pad and vessel wall, weld metal joining the pad to the outer surface of the vessel wall at the outer circumference of the pad, and the inner edge of the vessel wall at the opening providing a groove filled with weld metal joining the vessel wall to the inner end of the tube.

HOWARD A. BUEHNER.